United States Patent [19]

Nogle

[11] 4,012,904

[45] Mar. 22, 1977

[54] GAS TURBINE BURNER

[75] Inventor: Thomas Dushane Nogle, Troy, Mich.

[73] Assignee: Chrysler Corporation, Highland Park, Mich.

[22] Filed: July 17, 1975

[21] Appl. No.: 596,700

[52] U.S. Cl. .............................. 60/39.65; 60/39.71; 60/39.74 R; 60/39.72 R; 60/39.51 R; 431/352

[51] Int. Cl.[2] .............................. F02C 7/22

[58] Field of Search ........ 60/39.65, 39.71, 39.74 R, 60/39.72, DIG. 11, 39.06; 431/351, 352, 10

[56] References Cited

UNITED STATES PATENTS

| | | | |
|---|---|---|---|
| 3,309,866 | 3/1967 | Kydd | 60/39.36 |
| 3,722,215 | 3/1973 | Zhdanov et al. | 60/39.36 |
| 3,788,065 | 1/1974 | Markowski | 60/39.74 R |
| 3,792,581 | 2/1974 | Handa | 60/DIG. 11 |
| 3,808,802 | 5/1974 | Tanasawa | 60/39.65 |
| 3,826,078 | 7/1974 | Quigg | 60/39.65 |
| 3,851,466 | 12/1974 | Verdouw | 60/39.71 |
| 3,859,786 | 1/1975 | Azelborn et al. | 60/39.65 |
| 3,872,664 | 3/1975 | Lohmann et al. | 60/39.65 |
| 3,890,088 | 6/1975 | Ferri | 60/39.65 |
| 3,905,192 | 9/1975 | Pierce et al. | 60/39.71 |

OTHER PUBLICATIONS

Wade et al., "Low Emissions Combustion for Regenerative Gas Turbine", ASME Transactions, Apr. 1973, pp. 32–48.

Oppenheim et al., "Combustion R&D", Astronautics & Aeronautics, Nov. 1974, pp. 26–28.

Singh et al., "Formation and Control of Oxides of Nitrogen Emissions from Gas Turbine Combustion Systems", Journal of Engineering for Power, Oct. 1972, pp. 271–278.

*Primary Examiner*—Carlton R. Croyle
*Assistant Examiner*—Robert E. Garrett
*Attorney, Agent, or Firm*—Talburtt & Baldwin

[57] ABSTRACT

NOx formation in a fixed geometry burner is minimized during steady state operation of a gas turbine engine by burning homogenous gaseous fuel and air mixtures in successive combustion stages of controlled duration and temperature determined by fuel to air ratios proximate the lean limit for combustion. When combustion is substantially complete in each stage NOx, formation is further inhibited by quenching the combustion temperature with comparatively cool air or the lean mixture for the next successive stage.

NOx formation is effectively minimized during acceleration by supplying fuel to the combustion stages in sufficiently rich mixtures to consume all the available oxygen and to effect comparatively cool combustion temperatures. Adjacent the downstream end of the final combustion stage and appreciably upstream of the turbine rotor stages, the combustion temperature is again cooled by introducing a large excess of comparatively cool air which affects substantially complete oxidation of unburned HC and CO and a resulting maximum temperature approximating 2700°F. as the gaseous combustion products enter the rotor stages.

19 Claims, 11 Drawing Figures

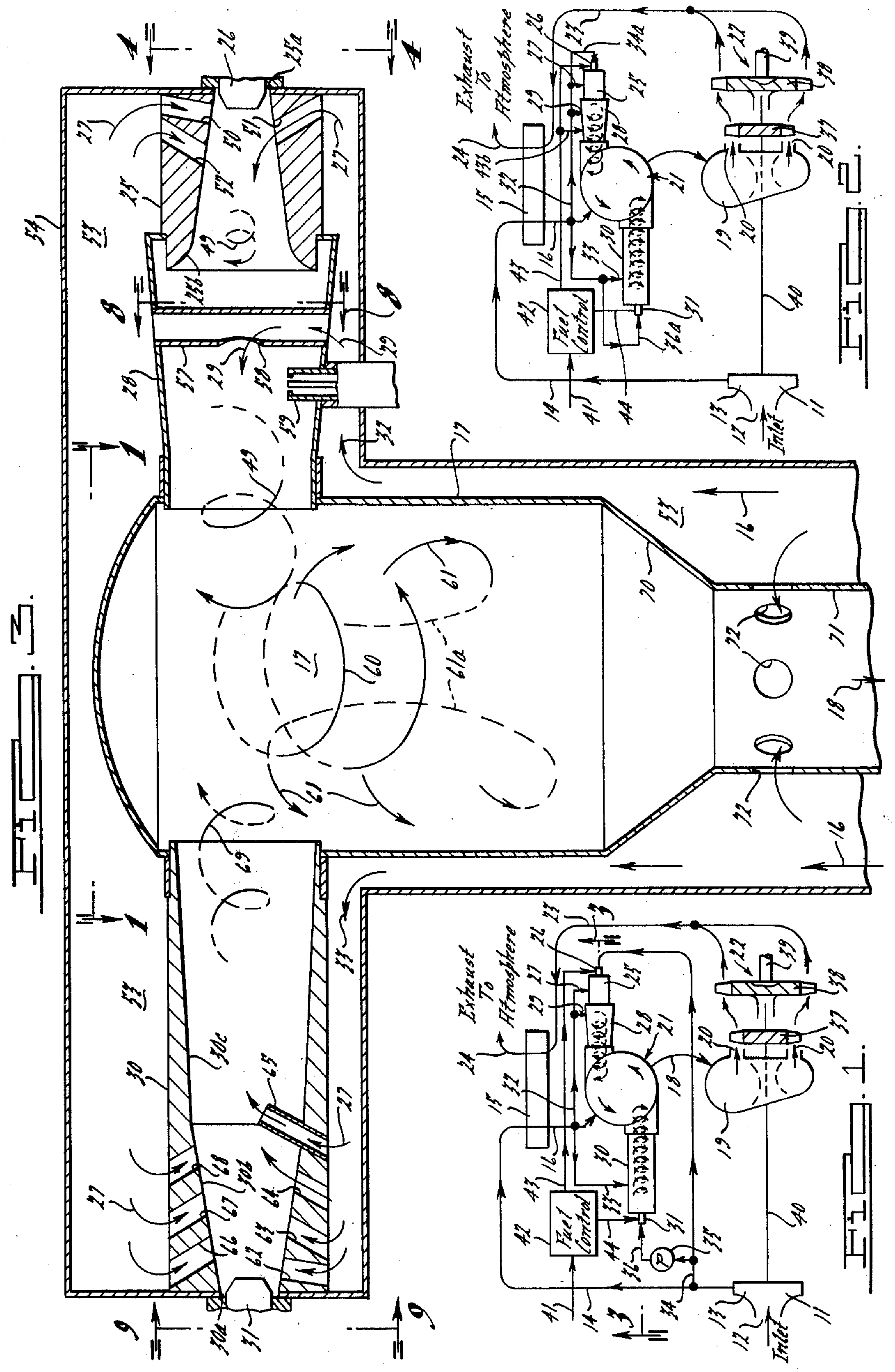
Exhaust To Atmosphere
Fuel Control
Inlet
Exhaust To Atmosphere
Fuel Control
Inlet

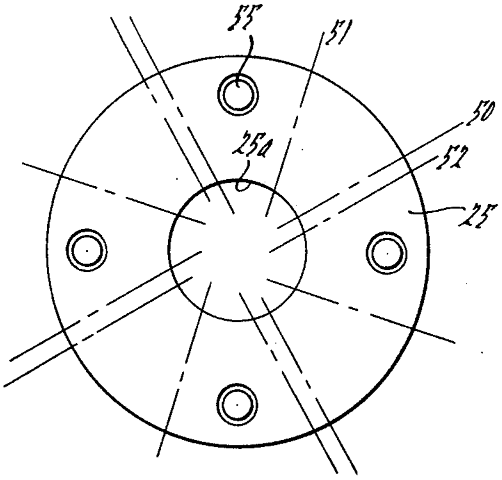
FIG. 4.
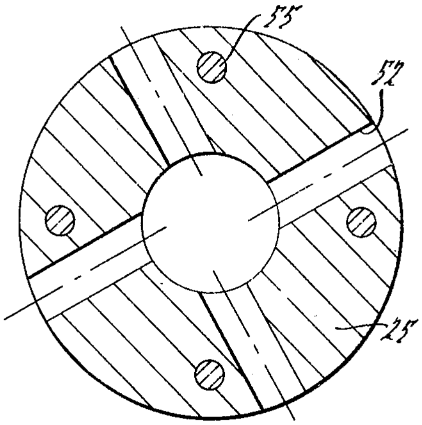
FIG. 7.
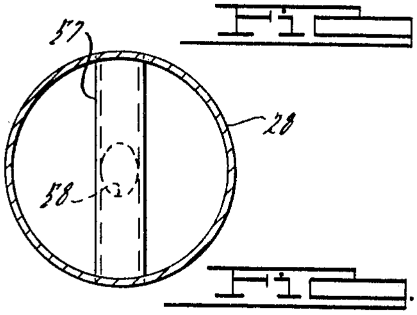
FIG. 8.
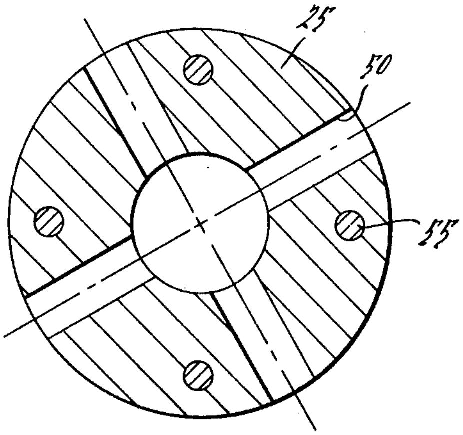
FIG. 5.
FIG. 9.
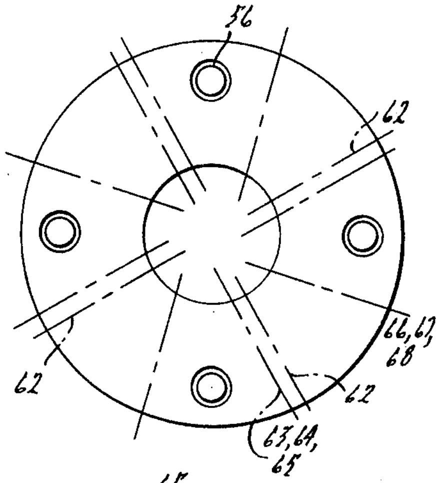
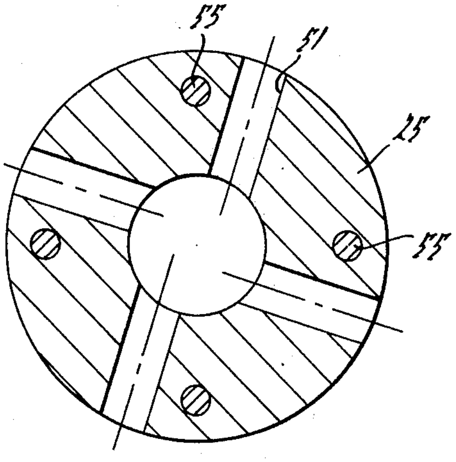
FIG. 6.
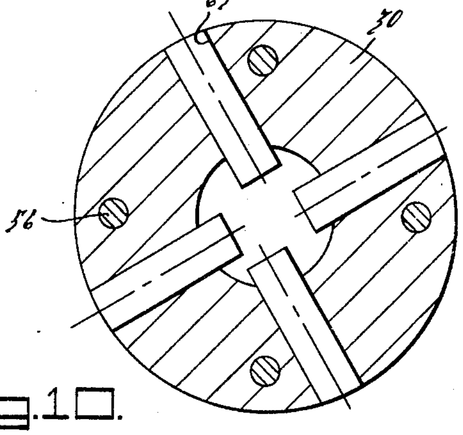
FIG. 10.

GAS TURBINE BURNER

BACKGROUND AND OBJECTS OF THE INVENTION

In a typical automobile gas turbine engine, ambient inlet air is supplied by a compressor or gas generator at comparatively low temperaturs and moderate pressures and preheated by flowing through an exhaust heated regenerator. The preheated inlet air is then conducted to a combustion chamber or burner where fuel is added and burned. The hot gases or combustion products from the burner are directed to the gas turbine rotor stages to drive the latter and power the compressor as well as the driving wheels of the automobile. The exhaust gases from the rotor stages contain appreciable heat energy which is transferred to the inlet air from the compressor via the aforesaid regenerator. The resulting appreciably cooled exhaust gases are then discharged to the atmosphere.

Without some provision to the contrary, the comparatively high combustion temperature in the burner creates an objectionable quantity of nitrogen oxides referred to hereinafter as NOx. Various burner designs and modes of operation have been proposed to minimize NOx formation during the combustion process. Such designs may be classified according to whether the geometry of the burner is variable or fixed. Burner systems having means for varying their size and/or shape in accordance with the operating mode of the engine have been fairly effective in reducing NOx formation, but such burners have required costly and sophisticated controls for the burner geometry.

The present invention is directed to a fixed geometry burner design wherein liquid hydrocarbon fuel is supplied to premixing chambers in the nature of a fog of finely dispersed droplets mixed with air and then vaporized. No external heat is added to the fuel prior to its entry into the premixer except incidentally from the environment of the hot engine. Heated air is supplied in controlled amounts to the premixer and the dispersed fuel droplets therein are vaporized and thoroughly mixed with the air to provide a lean combustible mixture. Several successive premixer stages may be employed and the mixture from each stage is ignited and burned for a controlled time period, whereupon the combustion temperature is rapidly reduced by the addition of cooler air or a lean fuel-air mixture from the next successive stage. The rate of combustion and the resulting temperature are predetermined for each stage by predetermining the fuel to air ratio in the mixture for that stage.

A number of suitable fuel dispersing nozzles are presently available to produce the desired fuel-air dispersion, thereby to expedite fuel vaporization and enhance engine operation. Also although the present invention is concerned primarily with liquid hydrocarbon fuel, the burner system described herein can also be employed with other liquid fuels, such as alcohol by way of example, or gaseous fuels.

It has been found in accordance with the present invention that if the fuel and a predetermined fraction of the compressed air are premixed and the fuel is substantially vaporized prior to combustion to provide a homogenous lean charge, the subsequent burning will provide low levels of contaminants, such as NOx in particular as well as unburned hydrocarbon (HC) and carbon monoxide (CO). However, in practice the gas turbine engine must operate over such a large fuel-air range that the desired low levels of the contaminants is not readily obtained.

It is an important object of the present invention to provide an improved fixed geometry burner or combustion system for an automobile gas turbine engine that achieves significant advantages of the variable geometry burner without their complexity and expense and which eliminates the necessity for sophisticated and costly control systems with their inherent problems of reliability, servicing, and associated problems.

Other and more specific objects are to provide both an improved combustion system of the above character and a method of operating a gas turbine engine utilizing the system, wherein lean supplies of fuel and air are thoroughly premixed at predetermined elevated temperatures in a number of premixing stages and thereafter substantially completely burned at controlled temperatures and in a limited time period at various locations along the flow path of the combustion gases. Each premixing stage either by itself or in combination with one or more of the other premixing stages supplies the fuel required for a predetermined range of steady state engine operating conditions. The first stage fuel-air mixture is preferably ignited at an upstream location in the combustion flow path and the resulting hot combustion products are employed to ignite the lean fuel-air mixtures of any subsequent stages.

The formation of NOx increases as either the temperature or time duration of the combustion process increases. Accordingly these factors are reduced as much as feasible. Combustion temperature decreases as the fuel-air ratio is reduced from the stoichiometric value, but the difficulty of igniting the fuel-air mixture and maintaining combustion increases with consequent increased CO and unburned HC in the combustion products. By increasing the precombustion temperature of the fuel-air mixture, ignition and combustion of leaner mixtures is enhanced, but of course the resulting combustion temperature is then increased. All of the above factors are taken into consideration.

In accordance with the present invention, fuel-air mixtures provided in the various stages are preferably near the lean limit that will support combustion when the engine is operating at the minimum fuel requirements for that stage, and the combustion supporting inlet air is supplied to the mixture at near the maximum temperature of the preheated air from the regenerator. Although three or more stages are within the scope of the present invention, it is desirable for the sake of structural simplicity and economy to utilize as few stages as feasible, depending on the size and character of the engine. An important object is to provide a burner of the above character wherein the first stage is dimensioned to operate over as large a fuel range as possible beyond the minimum fuel requirement for the engine.

A criterion limiting the maximum dimensions for the first stage premixer is that the latter's fuel-air mixture must readily ignite and burn substantially completely when the engine is operating at its lowest fuel requirement. As the fuel to the first stage premixer increases, the difficulty of ignition and complete combustion at the lean mixtures involved diminishes. On the other hand it will be apparent from the description herein that as the first stage apparatus is increased in size to operate satisfactorily with increasing amounts of fuel, a size will be reached where the minimum fuel requirement for the engine will not be sufficient to permit ignition and combustion.

The first and second stage apparatus and fuel-air mixtures are also predetermined so that the resulting first stage combustion temperature will be sufficient to ignite the fuel-air mixture from the second stage when the latter mixture is in its nominal lower range, i.e. during idle operation of the engine. It has been found that if the first stage fuel to air ratio is between approximately one-third and one-half the stoichiometric value, i.e., between approximately 0.023 and 0.035 by weight for hydrocarbon fuels where the stoichiometric value is approximately 0.067, combustion on the order of 90% or more complete is believed to be obtained, and at any rate the combustion temperature is sufficiently low and for a sufficiently short time interval that excessive NOx formation is avoided. (Note that all fuel-air ratios herein are by weight).

The first stage fuel-air mixture is ignited and burned in a first stage reactor dimensioned to enable approximately 90% complete combustion in the required short time interval and limited temperature. The temperature of the first stage combustion products is then reduced rapidly by quenching with an appreciably cooler second stage air stream or a lean premixed second stage fuel-air mixture, thereby to retard continued NOx formation.

In one embodiment of the invention, the first stage fuel operates the engine at its idle condition. At that condition, the second stage premixer supplies only quench air to cool the hot first stage combustion products as soon as combustion is substantially complete as aforesaid. When the engine load increases from the idle condition, fuel to one or both stages is increased and thoroughly mixed with the air for the corresponding stage. The fuel in the second stage mixture ignites as it comingles with the hot first stage combustion products. The mass of second stage air is approximately twice that of the first stage air, so that at or near the idle operating condition when no second stage fuel is supplied, the temperature of the resulting first and second stage mixtures may be as low as approximately 1800° F., well below the temperature of rapid NOx formation yet hot enough to continue HC and CO reactions. As the engine load and second stage fuel increase from the idle condition, the second stage fuel air ratio gradually increases but is not allowed to exceed approximately one-half the stoichiometric ratio during ordinary steady state operation of the engine, as for example up to approximately 80% of maximum engine or compressor speed, or approximately 75 to 80 mph for the specific engine involved, comprising a 150 horsepower engine driving approximately a 4300 lb. vehicle. Thus, the temperature of the comingled first and second stage combustion products is maintained below the level of rapid NOx formation, as for example below approximately 3000° F. (Note that all reference to operating conditions herein apply to steady state conditions, rather than to acceleration or deceleration conditions, unless specifically stated otherwise).

Similarly to the first stage reactor, the second stage reactor in which the second stage fuel-air mixture is burned is dimensioned so that substantially complete combustion is obtained in a sufficiently short time interval that NOx formation is nominal. At the end of the latter time interval, the second stage combustion temperature is reduced rapidly by the addition of comparatively cool third stage quench air amounting to approximately four times the mass of the second stage air, thereby to cool the resulting mixture during normal steady state operation of the engine to between approximately 1300° F. (at idle operation) and 1800°–1900° F. at high speed operation. NOx formation is thus stopped almost completely as the resulting mixture is conducted to the turbine rotor stages. Likewise HC and CO in the combustion products are insignificant by the time of the second quench.

Another object is to provide such a gas turbine combustion system having two fuel supply stages. The first stage is dimensioned to supply the curb idle power requirements for the engine and comprises a comparatively small first stage premixer that receives about 10% of the engine air and an amount of fuel to achieve a lean fuel-air ratio less than approximately one-half the stoichiometric value. The first stage premixer may comprise a conical chamber or extension of a fuel and air dispersing nozzle or fuel atomizer of conventional design for emitting a fog or fine dispersion of fuel droplets and air at high velocity coaxially into the small end of the conical first stage premixer. The amount of air, if any, required by the nozzle for dispersion of the fuel is comparatively small with respect to that required for the first stage premixer, so supplemental preheated air is injected through the conical sidewalls of the first stage premixing chamber to enhance turbulence and mixing of the fuel and air therein and to assure substantially complete evaporization of the fuel prior to ignition.

The large end of the conical first stage premixer discharges its thoroughly mixed fuel and air into one end of a comparatively small coaxial tubular first stage reactor, where additional air may be added and turbulent mixing is effected upstream of an electrical igniter. The igniter located in the first stage reactor ignites the mixture which burns as it progresses along the tubular reactor until the combustion is at least 90% and usually more than approximately 98% complete. The hot burning gases are then discharged from the first stage reactor into a second stage reactor, which in a preferred embodiment comprises a main burner, at temperature amounting to between approximately 2700° F. and 3200° F.

The second fuel stage of the burner system comprises a conical second stage premixer appreciably larger than the first to supply a large portion of the engine power requirements in excess of that required for idle operation. Similarly to the first stage premixer, fuel is supplied as a fog or finely dispersed mixture of fuel droplets and air into the small axial end of the second stage premixer via a fuel dispersing nozzle or atomizer. The fuel atomizers for two stages may or may not be of the same type and either may or may not use air to disperse the fuel.

Supplemental heated inlet air is injected through the conical sidewalls of the second stage premixer to evaporate the fuel and create a turbulent thorough mixing of the fuel and air within the second stage premixer prior to discharge of the second stage fuel-air mixture into the main or second stage burner. The total air supplied to the second stage premixer will amount to approximately 18% of the total air from the engine and will effect a second stage fuel to air ratio less than approximately one-half the stoichiometric value. The second stage premixer does not employ an igniter but the fuel-air mixture discharged therefrom is ignited by the hot combustion products from the first stage as the first and second stage gases comingle within the main burner.

By virtue of the foregoing, shortly after the initial ignition the engine obtains its operating temperature. The engine heat thus derived from the combustion system and recovered from the exhaust gases from the rotor stages via regeneration is thus available almost immediately to preheat the fuel-air mixtures within the premixing stages and to assist in vaporizing the fuel. On the other hand, the engine is not dependent on the preheating and vaporization for operation. The engine will readily start in a cold condition by igniting a diffusion of fuel droplets and air discharged from the premixing stages.

The first and second stage fuel atomizers may employ comparatively cool inlet air directly from the gas turbine compressor, or may employ air preheated by the regenerator. Also, either fuel atomizer may be of the air blast nozzle type which employs comparatively large quantities of air at high velocity and low pressure to disperse the fuel, or may be of the air atomizing nozzle type which employs an auxiliary air-pump to supply smaller quantities of the atomizing air at appreciably higher pressure to disperse the fuel, or may be effective without the use of air to disperse or "atomize" the fuel.

Other objects of this invention are to provide an improved combustion system for a gas turbine engine that appreciably reduces undesirable exhaust emissions of HC, CO and NOx during acceleration of the engine; and in particular to provide such a system wherein fuel-air ratios appreciably richer than stoichiometric are supplied to the successive combustion stages during engine acceleration, such that substantially all the available oxygen is consumed, the resulting combustion temperature is considerably below the corresponding temperature for stoichiometric mixtures, and NOx formation is thus substantially avoided. Adjacent the downstream end of the final combustion stage and appreciably upstream of the turbine rotor stages, a large excess of comparatively cool air is added to the hot combustion products (which are comparatively rich in unburned HC and CO) to cool the same below the temperature at which NOx formation is excessive and also to provide adequate air to complete the oxidation of Co and unburned HC and effect a resulting temperature approximating 2700° F. by the time these combustion products are directed into the turbine rotor stages.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a diagrammatic view of a gas turbine engine showing the fuel and air supply to the combustion chamber as seen from the latter's upstream end.

FIG. 2 is a view similar to FIG. 1, showing a modification.

FIG. 3 is an enlarged diagrammatic view of the burner system taken in the direction of the arrows substantially along the broken line 3—3 of FIG. 1.

FIG. 4 is an end view of the first stage premixer taken in the direction of the arrows substantially along the line 4—4 of FIG. 3, showing the center lines of the air inlet ports into the first stage premixer.

FIGS. 5, 6 and 7 are sectional views similar to FIG. 4, each diagrammatically showing only one set of orthogonally arranged inlet air ports having the centerlines illustrated in FIG. 4.

FIG. 8 is a sectional view taken in the direction of arrows substantially along the line 8—8 of FIG. 3, showing the baffle and flame stabilizer.

FIG. 9 is an end view of the second stage premixer taken in the direction of arrows substantially along the line 9—9 of FIG. 3, showing the centerlines of the various air inlet ports into the second stage premixer.

FIG. 10 is a sectional view similar to FIG. 9, diagrammatically showing only one set of orthogonally arranged inlet air ports having centerlines as illustrated in FIG. 9.

Figure 11:
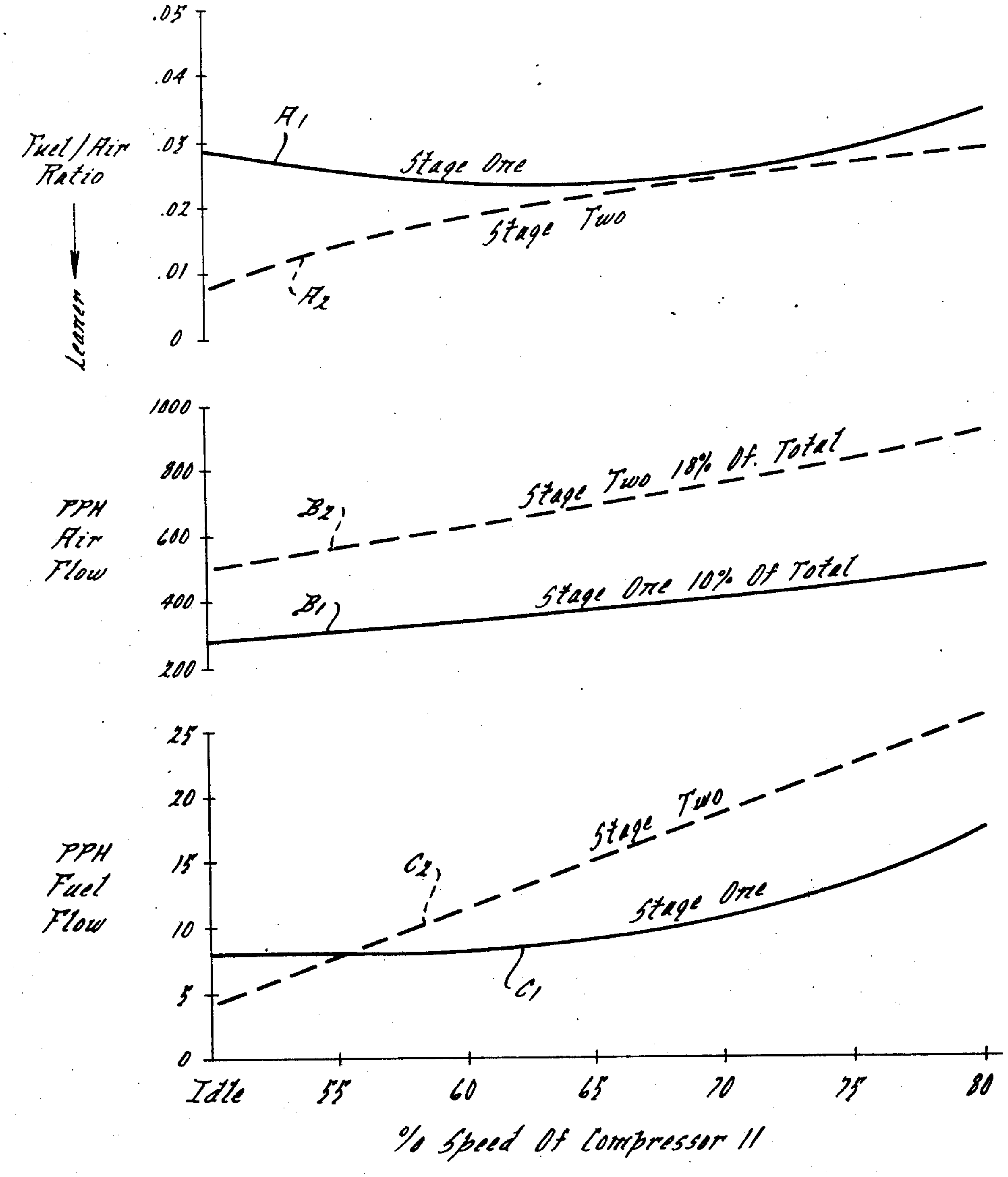
FIG. 11 graphically illustrates typical relationships between the air compressor speed during steady state operation of the gas turbine engine, and a. the fuel to air ratio by weight in the first and second stages premixers, curves A1 and A2 respectively, b. the air flow in pounds per hour supplied to the first and second stages, curves B1 and B2 respectively, and c. the fuel flow in pounds per hour supplied to the first and second stages, curves C1 and C2 respectively.

It is to be understood that the invention is not limited in its application to the details of construction and arrangement of parts illustrated in the accompanying drawings, nor to the illustrated proportions of fuel and air for the separate stages, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENTS

Referring to the drawings and in particular to FIGS. 1 and 3, the centrifugal compressor 11 for a gas turbine engine has an inlet 12 for atmospheric air and a radial outlet 13 for discharging the air under pressure via 14 to a rotating regenerator 15. The comparatively cool high pressure inlet air 14 passes through a hot sector of the regenerator 15 and is thereby heated to between approximately 900° F. and 1100° F., depending on the engine operating condition, and then discharged at 16 to a burner system 21 where fuel is added and burned to provide a hot charge of combustion gases. The hot combustion gases are discharged at 18 from the burner system 21 into a toroidal gas collection chamber 19, which in turn discharges these gases generally annularly at 20 to the turbine rotor stages 22 to rotate the latter. The exhaust gases from the rotor stages are discharged at 23 and then directed through a second cooler sector of the regenerator 15 to heat the latter, whereby the exhaust gases are in turn cooled and exhausted at 24 to the atmosphere. As the regenerator 15 rotates, its heated sector is continuously indexed into the path of the cooler inlet air 14 to heat the latter.

The burner system 21 comprises in addition to a main burner 17, FIG. 3, a first stage premixer 25 which receives, by way of illustration only because other means of fuel atomization are acceptable, a fine dispersion of fuel droplets and air discharged from a coaxial fuel-air dispersing nozzle 26. The dispersed air and fuel from the nozzle 26 enter the premixer 25 somewhat in the nature of a fine conical spray or fog which is thoroughly mixed with additional hot air 27 from the hot inlet air 16 via 32, FIG. 1, as explained below. The hot air 27 at between approximately 900° F. and 1100° F. evaporates the fuel in the mixture prior to its passage into a coaxial reactor tube 28. The fuel-air mixture is then ignited adjacent the upstream end of the reactor tube 28 and additional mixing is effected by the injection of supplemental hot air 29 via 32. The hot air 27 is directed into the fuel-air mixture to effect a clockwise spiral by way of example in the direction of flow axially within the premixer 25 and tube 28. The clockwise swirl of burning gases from the latter tube 28 enters tangentially into an upstream inlet end of the burner 17 of circular section to effect a generally counter-clockwise swirl thereon in the direction of flow.

The burner system 21 also comprises a second stage premixer 30 into which a fine dispersion of fuel or fog of air and fuel droplets is introduced from a second stage atomizer 31. Similarly to the dispersion in the premixer 25, the fuel in the second stage premixer 30 is evaporated and subjected to thorough premixing with air by supplemental hot inlet air 27 from 16 via 33, FIG. 1, directed into the premixer 30 to effect a clockwise spiral therein in the direction of flow axially toward burner 17 and generally tangentially into the latter's inlet end diametrically opposite the gases entering from the reactor 28, thereby to cooperate with the latter gases in affecting the aforesaid counter-clockwise swirl within the burner 17.

In FIG. 1, air 34 for the nozzles 26 and 31 is tapped from the inlet air 14 from the compressor 11 at a location upstream of the regenerator 15. This air at between approximately 7 p.s.i. and 45 p.s.i. (pounds per square inch) and at temperatures between 200° F. and 500° F., depending upon the operating speed of the compressor 11, is comparatively cool with respect to the preheated air at 16. The air 34 is supplied directly to the air blast type nozzle 26 at a pressure that may be only approximately ¼ p.s.i. above the pressure in burner 17. The air for the air atomizing type nozzle 31 is compressed additionally by a pump 35 and discharged via 36 into nozzle 31 at a pressure amounting to approximately 5 to 10 p.s.i. above the pressure in burner 17.

The cooler and higher density air 34 as compared to the regenerator pre-heated air 16 is particularly desirable and effective for dispersing liquid fuel into very fine fog-like droplets. Also be reason of the lower temperature of the air 34, fuel metering is facilitated because vaporization of the liquid fuel prior to dispersion is minimized. On the other hand, the hotter air 16 downstream of the regenerator 15 and supplied to nozzle 26 in FIG. 3 at about 900° to 1100° F. has the advantage of facilitating evaporation of the dispersed fuel. Also the higher temperature of the resulting fuel-air mixture enables ignition and combustion of a leaner fuel-air mixture with consequent lower NOx formation.

In any event, the temperature of the air supplied to the nozzles 26 and 31 is determined by engine operating conditions and is not controlling in regard to the present invention. The total volume of comparatively low pressure air supplied via the air blast type nozzle 26 for example to the premixer 25 amounts only to approximately 1% or 2% of the total engine air. The air atomizing type nozzle 31 has the advantage of using approximately only a tenth as much air as the nozzle 26 for a given weight of fuel dispersed and accordingly may use the cooler compressed air upstream of the regenerator 15 without appreciably affecting the resultant temperature of the second stage premixing air comprising primarily the much hotter auxiliary air 27 supplied to the premixer 30 via 33.

The engine illustrated in FIG. 2 is substantially the same as that above described except that the auxiliary air pump 35 is not employed. Instead of supplying inlet air to the nozzles 26 and 31 via 34 and 36 from the inlet air source 14 upstream of the regenerator 15, the nozzles 26 and 31 are supplied with preheated inlet air from 16 downstream of the regenerator 15 via **34*a* and 36*a* respectively. Any of the nozzles in FIGS. 1 and 2** may usually be exchanged for any one of the others. The characteristics of the available nozzles are well known and are selected in accordance with the specific requirements determined by the dimensions and operating characteristics of the overall combustion system.

The rotor stages 22 in the present instance comprise the gas generator driving rotor 37 and a coaxial power output rotor 38 which drives a power output shaft 39 preferably connected with various engine accessories and the drive wheels of the automobile. The rotor 37 is connected by shaft 40 with the compressor 11 to drive the same. Fuel for the engine in the present instance may comprise gasoline or any other suitable fuel such as jet or diesel fuel or kerosene supplied from a source 41 to a fuel control device illustrated schematically at 42. The latter is responsive to various ambient conditions such as air temperature, humidity, pressure, etc., and various engine operating parameters, such as engine load, temperature, compressor speed, etc., and supplies metered fuel via 43 and 44 to the atomizers 26 and 31 respectively at predetermined rates as required by engine operating conditions. Some of the fuel may be diverted as at **43*b* to facilitate ignition of the first stage fuel-air mixture, as explained herein. Also, some fuel may be returned through appropriate bleeds to the control unit or the fuel source 41**, as means of preventing fuel line vapor formation and/or providing fuel drainage from the fuel nozzles during fuel-off conditions.

The high combustion temperatures and the large excess of combustion supporting air typically associated with gas turbine engines readily enable the complete combustion of fuel in the burner 17, such that the emission of CO and HC in the exhaust has not been a primary problem. However, the aforesaid factors that enable complete combustion are also favorable to the production of NOx. In general, as far as the combustion of conventional automobile gasoline is concerned, maximum NOx is formed when a stoichiometric fuel-air mixture is burned, i.e., at a fuel/air ratio approximating 0.067. When either leaner or richer mixtures are burned, NOx formation decreases, partly at least because of the cooler combustion temperatures that result. If the major combustion is accomplished with a lean fuel-air mixture amounting to approximately one-half the stoichiometric value, i.e., for example less than approximately 0.035, at a temperature below approximately 3200° F. and preferably in the 2700° F. to 3200° F. range, NOx formation will be sufficiently low to meet reasonable requirements. CO and HC will be fairly high in the initial combustion products as a result of such a lean mixture, but the combustion or oxidation of these components may be substantially completed at the temperature involved by continued reaction in the burner system as described below.

The burner system is comparatively independent of a specific geometry, fuel, or fuel dispensing atomizer, except to the extent that through mixing of the lean fuel-air mixture prior to combustion is essential to eliminate localized variations in the fuel-air mixture, such as localized stoichiometric regions in the mixture where the combustion would result in localized hot spots and excessive NOx formation. Thus, the system must also prevent upstream flashback of the flame into the region where the mixture is not yet uniform.

Referring now in particular to FIGS. 3–7, the first stage premixer 25 preferably comprises a short conical chamber having the atomizer 26 discharging coaxially into its smaller end 25*a*. The end 25*b* in particular enlarges rapidly to create eddy turbulance and to retard the axial flow rate of the fuel-air mixture as it enters the larger diameter of the generally conical reaction tube 28 secured coaxially to the downstream end of the mixer 25. Although the interior of the premixer 25 is referred to herein as being conical, it is preferably a shaped passage of gradually enlarging circular cross-section dimensioned to effect a minimum resistance to the turbulent gas flow therein while preventing flashback of the flame into the premixer as explained below. Likewise the reaction tube 28 may well be cylindrical or otherwise shaped.

,The conical fog of fuel and air discharged from atomizer 26 travels axially leftward at comparatively high speed toward the conical reactor tube 28 also of circular cross section. The clockwise swirl 49 and a thorough mixing of the fuel dispersed from nozzle 26 is accomplished by the injection of air 27 as aforesaid through a number of ports or air passages 50, 51 and 52 arranged at various angular relationships in the conical sidewall of the premixer 25 at axially and circumferentially spaced locations. The ports 50–52 communicate with a passage 53 defined by an outer shroud 54 that substantially encloses the burner system and is secured to the outer ends of the premixers 25 and 30 by bolts 55 and 56, respectively, FIGS. 4–7, 9 and 10.

At a location adjacent the lower or downstream end of the burner 17, FIG. 3, the passage 53 is in communication with the hot inlet air 16 from the regenerator 15. The passage 53 encloses the burner 17 and first and second fuel supply and premixing stages 25, 28 and 30, thereby to insulate the portions of the engine exteriorly of the shroud 54 from the intense burner heat and also to enable additional preheating of the inlet air 16 in passage 53 and consequent cooling of the reactors 28 and 17 as the air 16 flows upward in FIG. 3 around the burner 17 and laterally at 32 and 33 around the first and second fuel premixing stages.

As illustrated in FIG. 4 where only the center lines of the air passages are indicated, each of the passages 50, 51 and 52 comprises a sset of four orthoganally arranged ports that converge in a downstream direction, FIG. 3, toward the principal conical axis of the premixer 25, thereby to accelerate the axial flow of the fuel-air mixture toward the large end 25*b* of the premixer 25. Also as is evident from FIGS. 4–7, the axes of the set of inlet air ports 50 intersect the conical axis of premixer 25 to effect a shearing and turbulent mixing action for the fuel-air mixture, whereas the axes of the sets of ports 51 and 52 intersect the interior of premixer 25 off center from the latter's axis to impart the aforesaid clockwise swirl 49 in addition to the shearing and turbulent mixing. Thus, by virtue of the high temperature air injected from passage 53, by the time the fuel-air mixture emerges from the large conical end 25*b*, evaporation of the liquid fuel and its thorough mixing with the air is substantially complete.

It is to be noted in the above regard that the temperature of the preheated air 27 is greater than required for spontaneous combustion of the fuel-air mixture in the premixer 25. It is therefore important that the shearing and mixing does not cause regions of stagnation or undue recirculation in the premixer 25. Inasmuch as spontaneous combustion at any temperature requires a predetermined residence time for the gas at that temperature, the fuel-air mixture will not ingite within premixer 25 if the axial flow rate is sufficient to enable each mixture unit to reach the igniter 29 during the associated aforesaid residence time. Thus the cross-sectional area of premixer 25 increases in the axial downstream direction at a rate greater than required merely to accommodate the increasing volume of the fuel-air mixture as preheated air enters via the axially spaced ports 50–52 and as the liquid fuel droplets evaporate. If the premixer 25 were cylindrical, for example, and properly dimensioned at its downstream end 25*b*, the flow adjacent its upstream end 25*a* could be so slow that spontaneous combustion would occur.

Secured within the reactor tube 28 adjacent its upstream end is a transverse tubular flame stabilizer 57 of generally circular section and in communication at its opposite ends with passage 53. Downstream of the tube 57 is an electrically energized igniter that operates to ignite the first stage fuel-air mixture. By virtue of air 29 flowing into tube 57 from passage 53 and out port 58, the tube 57 is maintained comparatively cool with respect to the ignited gases and in cooperation with the rapid leftward flow of the fuel-air mixture from the premixer 25 prevents rightward travel of the combustion flame. The tube 57 also serves as a baffle to create additional turbulence within the surrounding fuel-air mixture as the latter flows toward the igniter 59.

As aforesaid, in a specific burner arrangement by way of example, the fuel supplied by the stage 1 nozzle 26 is preferably sufficient for curb idle operation of the engine. As the engine speed increases above idle, the fuel supplied to the stage one nozzle 26 by operation of the fuel control 42 remains substantially constant, FIG. 11, curve C1, until the compressor 11 attains approximately 65% of its rated maximum speed which is usually adequate for moderate speed cruising conditions, for example up to approximately 60 miles per hour. The air flow through the fixed ports 50, 51, 52 and 58 increases proportionately with the speed of the compressor 11, so that the stage one fuel-air ratio gradually becomes leaner and approaches 0.023 as the compressor speed approaches the 65% value. Simultaneously the first stage combustion temperature correspondingly reduces to the above mentioned lower limit approximating 2700° F. The leaner first stage fuel-air mixture readily ignites at 59 becuase the temperature of the premixing inlet air 16 from the regenerator 15 increases toward the aforesaid 1100° F. value with increasing engine load. Also the cooler first stage combustion products, as for example at 2700° F., readily ignite the stage two fuel-air mixture because, as described below, the latter mixture is gradually enriched by operation of the fuel control 42 to supply power for the increased engine load.

As the speed of compressor 11 increases from 60–65% to approximately 80% of its maximum, the fuel control 42 gradually increases the first stage rate of fuel supply and fuel-air ratio to the 0.035 level, FIG. 11, curve A1, thereby gradually increasing the stage one combustion temperature to the approximate 3200° F. upper limit. The permissible 3200° F. overall first stage steady state combustion temperature is somewhat greater than the overall gas turbine combustion temperature permissible heretofore with reasonable NOx values. This is true at least in part because the thorough premixing in the present invention avoids localized fuel rich regions in the mixture that heretofore created localized temperatures in the neighborhood of 4200° F. to 4500° F. with consequent high NOx formation, regardless that the overall or average combustion temperature heretofore might have been less than 3200° F. The 3200° F. maximum stage one temperature described above is associated only with idle operation of the engine when the total fuel supply is a minimum, or for the short time intervals when the engine is operating with the compressor speed greater than 80 % of maximum. Thus the mass of NOx formed at the maximum combustion temperature is not excessive. Also the high combustion temperature for any particular unit of the fuel-air-mixture endures only for the short time interval required for the particular unit to travel axially along reactor 28 into burner 17, whereat the stage one combustion temperature is cooled by comingling with the lean stage two mixture. Throughout the operating range of the compressor 11, the air supplied to the first stage reactor 28 via nozzle 26 and ports 50–52 and 59 amounts to about 10% of the total engine air flow. Approximately 10% to 20% of the first stage inlet air is supplied via the nozzle 26.

The proportions of fuel and air supplied by the two premixing stages 25 and 30 may be varied somewhat by changing the relative dimensions of the latter and burners 28 and 17, the type of igniter 59 and other factors such as the mixture pressure and temperature. The fuel and air proportions illustrated in FIG. 11 are associated with a simple spark igniter 59. By increasing the area of contact between the spark or flame of the igniter 59 and the first stage mixture, an appreciably leaner first stage mixture can be ignited. It has been found that by employing a torch igniter 59 wherein a small portion of the first stage fuel or fuel and air is ignited and discharged as a flame from the igniter 59 across the axial flow of the main first stage fuel-air mixture, the area of contact between the mixture discharged from premixer 25 and the ingiting flame from 59 enables the ignition of a leaner first stage mixture than illustrated in FIG. 11.

In a specific instance, the fuel supplied to the torch igniter 59 via 43*b*, FIG. 2, amounted to about one pound per hour at idle and was gradually increased to about two pounds per hour at 80% compressor speed. Inasmuch as the same total amount of fuel is required regardless of the type of igniter used, the air inlet ports 50–52 were enlarged to supply the additional air required for the leaner mixture. The ports 72 were correspondingly reduced so that the total fuel and air supply to the engine remained constant. Fuel supply 43*b* for a torch igniter is shown only in FIG. 2, although a torch igniter or a simple spark igniter or other ignition means may be employed with either engine of FIG. 1 or FIG. 2.

During conditions of engine braking, with the compressor 11 at idle speed, the deceleration of the vehicle is employed to supply power to the engine which increases the temperature of the gases emerging at 23 (as compared with the temperature at curb idle) from the rotor 38 and thus increases the cycle temperature of the regenerator 15 and the preheated inlet air 16. The higher temperature of the inlet air 16 increases the temperature of the fuel-air mixture at igniter 59 and enables ignition of a leaner mixture than is possible at curb idle. Accordingly, during engine braking the fuel control 42 operates in response to such conditions as the braking load and temperature of the inlet air 16 to reduce the fuel supply to nozzle 26 without extinguishing the burner flame.

During steady state operation, by the time the combustion gases emerge from the stage one reactor 28, combustion is substantially complete, i.e. at least 90% and as much as 98% or more at the higher temperatures. These hot gases are discharged from athe leftward or downstream end of the reactor tube 28 generally tangentially into the upstream end of the circularly cylindrical burner 17 to impart the counter-clockwise swirl 60 therein. A characteristic of the counter-clockwise swirl 60 as the mass of gases moves axially downstream along the burner 17, i.e., downward in FIG. 3, is that the static pressure has a radial gradient from a higher pressure near the central axis of the burner 17 to a lower peripheral pressure, which in cooperation with the axial pressure gradient in the burner 17 and the centrifugal force of the counter-clockwise swirl superimposes a generally radially outward and downward component of flow 61 and a central upward counter flow or recirculation 61*a*, indicated by broken line arrows, that enhances the mixing in burner 17 and maintains a comparatively uniform combustion temperature transversely of the burner axis. The resulting flow relative to the burner 17 is spirally downward near the circumference, but upward near the center, with both the counter-clockwise velocity and the axial downward velocity increasing near the cylindrical periphery of the burner 17. The higher speed of the axially downward component of flow near the periphery of the burner 17 and the resulting shearing and mixing action within the burner gases is augmented by the clockwise swirl 49 of the gases emerging from the reactor 28, as also indicated schematically by the gas flow arrows within reactor 25, and mixer 30, FIGS. 1 and 2.

The second stage premixer 30 also has a conical interior that enlarges in the downstream direction from a small end 30*a* into which the coaxial conical finely dispersed fuel-air mixture or fog is sprayed from the nozzle 31. The premixer 30 comprises a short rapidly enlarging upstream portion 30*b* somewhat comparable in size to the first stage premixer 25, and a larger less rapidly enlarging downstream portion 30*c*. Also similarly to the first stage air inlet ports 50–52, the second stage premixer portion 30*b* is provided with a number of sets of air inlet ports or passages 62 through 68 in communication with the hot inlet air 27 in passage 53 and dimensioned to provide approximately 18% of the total air supplied to the burner 17. Each set of ports 62 through 68 comprises four orthogonally arranged air passages, the passages of each set extending through the conical sidewall of the premixer 30 at various circumferentially and axially spaced location to effect thorough premixing of fuel and air, as described above in regard to the first stage premixing.

The second stage fuel-air mixture is discharged prior to being ignited generally tangentially into the upstream end of the burner 17, FIGS. 1 and 2, at a location diagonally opposite the gases emerging from the stage one reactor to augment the counter-clockwise swirl 60 in the burner 17. Also similarly to stage one, the stage two air inlet ports are arranged to accelerate axial flow and to impart a clockwise swirl 69 with severe shearing of the fuel-air mixture in the premixer 30, such that the above described toroidal flow 61–61*a* and the consequent shearing and mixing within the burner 17 is also augmented as described above in regard to the stage one clockwise swirl 49. The same considerations as described above in regard to premixer 25 also apply to the angular arrangement of the ports 62–68 and the downstream enlargement of the premixer 30.

Only the center lines of the gas passages 62 through 68 are indicated in FIG. 9. The axes of the four ports 62 intersect the axis of the conical premixer 30 at a downstream inclination to effect the shearing and mixing of the second stage fuel-air mixture and to accelerate its axial flow toward the burner 17. The axes of the four ports in each of the sets 63, 64 and 65 (and likewise for the sets 66, 67 and 68) are arranged in common orthogonal planes parallel to the axis of the premixer 30, as seen in the end view 9. Inasmuch as these ports are similar in structure and operation to the ports 50, 51 and 52, they are not illustrated in separate views. The ports 65 comprise tubular extensions into the interior of the premixer 30 and serve as turbulence creating baffles. Also by reason of the high inlet air temperature in passage 53, substantially complete evaporation of the second stage fuel occurs within the premixer 30. The resulting increase in the volume of the mixture cooperates with the angles of the air injection ports 62–68 to accelerate the axial gas flow within the premixer 30.

The preheated air supplied via the fixed ports 62–68 into premixer 30, as well as via the fixed ports 50–52 and 58, will be automatically proportional to the speed of compressor 11. The fuel control 42 operates to supply only nominal fuel and preferably none to the second stage nozzle 31 during idle operation of the engine, and to increase the fuel flow to nozzle 31 at a rate generally proportionate to the increase in the speed of the air compressor 11 to effect a lean fuel-air ratio within premixer 30 ranging from less than approximately 0.01 to approximately .028 as the speed of compressor 11 increases from just above idle speed to approximately 80% of its maximum, FIG. 11, curve A2. The velocity of discharge of the lean second stage fuel-air mixture from reactor 30 is too rapid to allow combustion of the lean mixture therein at the temperatures prevailing, but the second stage fuel ignites as soon as it mixed with the hot combustion products discharged from the first stage reactor 28 into the burner 17. The latter is thus the second stage reactor for the second stage premixer 30.

As the lean fuel-air mixture burns within burner 17, the second stage combustion temperature during steady state operation rises from between approximately 1800°–1900° F. at curb idle to approximately 3000° F. at 80% of the speed of compressor 11, so that the rate of NOx formation is minimized. Even this minimized rate of NOx formation will exist for only the short time interval required for the combustion products to travel the axial length of the combustion chamber 17. At the temperatures involved, the oxidation of CO and HC is nearly 100% completed as the combustion products move axially downward in the burner 17. In order to accelerate the hot gas stream to the velocity required for efficient turbine rotor power recovery, the burner 17 is restricted at 70 near its discharge end 71. The latter is of reduced cross section and directs the hot combustion products 18 to the toroidal collector 19 as described above. At or immediately upstream of the discharge end 71, the remaining approximately 72% of the hot inlet air is conducted from passage 53 into the burner 17 via a plurality of radial ports 72, thereby to quench the temperature of the second stage gases from burner 17 to between approximately 1200° F. at idle operation and approximately 1900° F. at maximum compressor speed. By virtue of adding the second quench downstream of the restriction 70, the mixing rate is enhanced because of the increased circumference to area ratio and the increased rate of the axial gas flow. At all normal steadystate conditions, combustion reactions and NOx formation will be negligible at these temperatures.

In order to provide acceptable driveability and in particular a fast response to throttle demands, it is necessary to accelerate the compressor 11 quickly in response to a demand for a rapid increase in engine power. Such acceleration is normally less than one second in duration, but requires a high fuel flow rate with a resulting high NOx level in conventional combustors.

In accordance with the present invention, during the acceleration mode, the fuel control 42 is operated to deliver sufficient fuel to the atomizers 26 and 31 to enrich the fuel-air ratios to between approximately 0.10 and 0.15 in both the first and second premixer stages, i.e., from approximately one and one-half to approximately two and one-quarter times the stoichiometric value. These rich mixtures burn at cooler than stoichiometric temperatures and consume virtually all of the available oxygen, so that formation of NOx is effectively limited within both the reactor 28 and the main burner 17.

At the region 72 of the final quench and appreciably upstream of the rotor stages 22, the hot rich combustion products are suddenly cooled by the incoming air to effectively limit NOx formation regardless of the excess oxygen thus made available. The excess oxygen in the final temperature quenching air enables the oxidation of HC and CO to be completed within the chamber 19 and effects a final temperature rise to approximately 2700° F. by the time the gaseous combustion products enter the rotor stages 22. However, the rate of NOx formation is slow at the temperatures involved and the time interval for the oxidation process within chamber 19 is sufficiently short, so that NOx formation is nominal.

Having thus described my invention, I claim:

1. In combination, a combustion system for minimizing localized concentrations of fuel and regions of high temperature combustion in lean combustible fuel-air mixtures for a gas turbine engine comprising first stage supply means for supplying first stage fuel and air at predetermined temperatures and rates to effect a lean preheated combustible first stage mixture when thoroughly mixed, first stage premixing means for receiving and thoroughly mixing said first stage fuel and air, a first stage combustion chamber for receiving the first stage fuel and air mixture from said premixing means, igniter means for igniting said mixture in said combustion chamber, ssecond stage supply means for supplying second stage fuel and air at predetermined temperatures and rates to effect a lean preheated mixture when thoroughly mixed that is comparatively cool with respect to the combustion products from said combustion chamber, second stage premixing means for receiving and thoroughly mixing said second stage fuel and air mixture, a second stage combustion chamber for receiving the combustion products from said first stage combustion chamber and also for receiving and burning therein said thoroughly mixed second stage fuel and air mixture, said second stage combustion chamber having upstream and downstream ends and a circular section transverse to the direction between said ends, said first and second stage supply means comprising a source of preheated air and a plurality of air ports in communication with said preheated air and extending angularly through the walls of said first and second stage premixing means to discharge said preheated air thereinto and to effect said thorough mixing of said fuel and preheated air within the corresponding premixing means, means for igniting said second stage mixture and for appreciably inhibiting the rate of NOx formation in said combustion products by quenching the temperature thereof comprising means for comingling said second stage mixture with said combustion products, the last named means comprising means for discharging said second stage mixture and combustion products into said second stage combustion chamber adjacent said upstream end and generally tangentially to the circular section of said second stage combustion chamber to impart a swirl to gas flow in the latter chamber.

2. In the combination according to claim 1, said first stage combustion chamber being dimensioned for combustion therein of a first stage mixture containing less than the quantity of fuel required for curb idle operation of said engine.

3. In the combination according to claim 1, said first stage combustion chamber being dimensioned to effect substantially complete combustion of the fuel therein in a limited short time interval determined by the tolerable NOx formation during said combustion.

4. In the combination according to claim 1, each supply means comprising means for supplying liquid fuel to its respective premixing means in a fine dispersion, each premixing means being dimensioned and the quantity and temperature of the air supplied thereto being predetermined for evaporating said fuel substantially completely therein prior to igniting the latter fuel, and each combustion chamber being dimensioned for substantially completing the combustion of the fuel therein prior to quenching the temperature of the combustion products thereof.

5. In the combination according to claim 1, second quenching means for appreciably inhibiting the rate of NOx formation in said second stage combustion chamber by quenching the temperature of the combustion products therein comprising means for comingling cooler third stage gases with the latter combustion products adjacent a downstream end of said second stage combustion chamber.

6. In the combination according to claim 5, said second stage air comprising approximately twice the first stage air, the third stage gases comprising the remaining air to said engine and amounting to approximately three times the second stage air.

7. In the combination according to claim 1, shroud means enclosing said premixing and reactor means and spaced therefrom to define a passage for said preheated air around said premixing and reactor means in heat exchange and thermal insulating relationship, said passage having an upstream end in communication with said preheated air adjacent the downstream end of said second stage combustion chamber to effect a counter flow of said preheated air around the latter with respect to the flow of combustion products therein.

8. In combination, a fixed geometry combustion system for minimizing localized concentrations of fuel and regions of high temperature combustion in lean combustible fuel-air mixtures for a gas turbine engine comprising a first stage premixer for receiving and thoroughly mixing therein a first stage supply of fuel and air, a first stage reactor for receiving and burning therein the first stage fuel and air mixture from said premixer, igniter means for igniting said mixture in said reactor, and first stage supply means for supplying first stage fuel and preheated air to said first stage premixer to effect a lean fuel to air ratio therein, said supply means comprising a plurality of air ports in communication with said preheated air and extending into said premixer for discharging the preheated air therein to swirl and shear said mixture therein, means for preventing upstream propagation of the combustion flame in said reactor comprising flame arresting means upstream of said igniter means, said flame arresting means comprising a tubular baffle of heat conducting material cooled with respect to the temperature of said combustion flame by conducting said preheated air therethrough, said tubular baffle having an inlet in communication with said preheated air to receive the same and having an outlet in communication with said premixer at a location upstream of said igniter means for discharging said preheated air into said premixer at said location.

9. In combination, a fixed geometry combustion system for minimizing localized concentrations of fuel and regions of high temperature combustion in lean combustible fuel-air mixtures for a gas turbine engine comprising first stage supply means for supplying first stage fuel and air to effect a combustible first stage mixture, a first stage reactor for receiving and substantially completely burning said first stage mixture therein, igniter means for igniting said mixture in said reactor, second stage supply means for supplying fuel and air at predetermined temperatures and rates to effect a lean preheated second stage mixture, premixing means for receiving said second stage mixture, said second stage supply means comprising a source of preheated air and a plurality of air ports of fixed dimensions in communication with said preheated air and extending angularly through the walls of said premixing means for discharging said preheated air thereinto for evaporating the fuel in said second stage mixture and thoroughly mixing the same with said preheated air within said premixing means, a combustion chamber for receiving the combustion products from said first stage reactor and also for receiving and burning therein the thoroughly mixed second stage mixture of air and evaporated fuel from said premixing means, said combustion chamber having an upstream inlet end and a downstream outlet end and a circular section transverse to the direction between said ends, and means for igniting said second stage mixture within said combustion chamber comprising means for discharging the latter mixture and combustion products into said combustion chamber for comingling therein, the last named means comprising means for discharging said second stage mixture into said combustion chamber generally tangentially to its circular section adjacent said upstream end for imparting a swirl to gas flow therein.

10. In the combination according to claim 9, said first stage supply means comprising means for supplying said second stage mixture at temperatures and at fuel to air ratios proximate the minimum required for ignition in said combustion chamber.

11. In the combination according to claim 9, said reactor being dimensioned and said fuel to air ratio and the temperature of said first stage air being predetermined to effect substantially complete combustion in said reactor prior to igniting said second stage mixture.

12. In the combination according to claim 9, said first and second stage supply means cooperating with said first stage reactor and premixing means for swirling the mixtures therein and discharging the same in spiral swirls into said combustion chamber, the direction of the spiral swirls in said premixing means being predetermined to cooperate with the first named swirl in said combustion chamber for accelerating an axial downstream flow of said mixtures adjacent the periphery of said first named swirl and for inhibiting said axial downward flow adjacent the axial center of the latter swirl.

13. In the combination according to claim 9, means for appreciably inhibiting the rate of NOx formation in said combustion chamber comprising temperature quenching means for comingling cooler third stage gases with the combustion products in said combustion chamber adjacent a downstream end of the latter.

14. In the combination according to claim 13, said combustion chamber being dimensioned to effect substantially complete combustion of the fuel therein prior to said quenching.

15. In the combination according to claim 14, said second stage supply means comprising means for discharging a fine dispersion of second stage liquid fuel droplets into said premixing means, said premixing means being dimensioned to effect substantially complete evaporation of said droplets therein prior to discharging said second stage mixture into said combustion chamber.

16. In the combination according to claim 8, said baffle extending generally diametrically across the flow of said fuel and air mixture from said premixer to said reactor to impart turbulence to said flow.

17. In the combination according to claim 14, said third stage gases comprising the major portion of the total engine inlet air.

18. In the combination according to claim 14, said third stage gases comprising more than 70% of the total engine inlet air.

19. In the combination according to claim 13, said third stage gases comprising more than 70% of the total engine inlet air.

* * * * *